(12) United States Patent
Hulstedt

(10) Patent No.: US 6,832,535 B1
(45) Date of Patent: Dec. 21, 2004

(54) AIR EJECTION AND COMPLIANT GAGE PIN FOR ROD CUTTING MACHINES

(75) Inventor: Bryan Hulstedt, Rockford, IL (US)

(73) Assignee: Rockford Manufacturing Group, South Beloit, IL (US)

( * ) Notice: Subject to any disclaimer, the term of this patent is extended or adjusted under 35 U.S.C. 154(b) by 0 days.

(21) Appl. No.: 09/667,971

(22) Filed: Sep. 25, 2000

(51) Int. Cl.$^7$ ................................................. B26D 7/18
(52) U.S. Cl. ................................ 83/98; 83/99; 83/268; 83/653
(58) Field of Search ........................... 83/99, 98, 196, 83/198, 199, 236, 262, 268, 111, 118, 697, 686, 653, 907, 906, 247

(56) References Cited

U.S. PATENT DOCUMENTS

| | | | | |
|---|---|---|---|---|
| 2,219,682 A | * | 10/1940 | Doble | 83/157 |
| 2,251,135 A | * | 7/1941 | Iknayan et al. | 83/19 |
| 3,550,491 A | * | 12/1970 | Wingard | 83/99 |
| 3,710,666 A | * | 1/1973 | Keyes et al. | 83/99 |
| 3,781,124 A | * | 12/1973 | Bodycomb | 408/61 |
| 3,800,642 A | * | 4/1974 | Hasler et al. | 83/98 |
| 3,800,645 A | * | 4/1974 | Alcock et al. | 83/198 |
| 4,090,425 A | * | 5/1978 | Platt | 83/402 |
| 4,283,974 A | * | 8/1981 | Kline | 83/42 |
| 4,302,996 A | * | 12/1981 | Wilhelm | 83/198 |
| 4,409,871 A | * | 10/1983 | Neumann | 83/104 |
| 4,628,780 A | * | 12/1986 | Hicks | 83/99 |
| 5,156,073 A | * | 10/1992 | Zanzeri et al. | 83/13 |
| 6,276,246 B1 | * | 8/2001 | Bezama et al. | 83/24 |

* cited by examiner

Primary Examiner—Kenneth E. Peterson
Assistant Examiner—Omar Flores Sánchez
(74) Attorney, Agent, or Firm—Leydig, Voit & Mayer, Ltd.

(57) ABSTRACT

A closed-knife rod cutting machine is provided with air ejection apparatus for automatic discharge of cut rods. The gage pin is compliant in the direction of the knife return stroke to permit ejection of a lodged cut rod by the advancing rod stock. The free end of the compliant gage pin is tapered to assist in clearing cut rods loosely lodged in knife, and the gage pin is timed to retract when the knife engages the rod stock at the beginning of the cutting cycle.

6 Claims, 6 Drawing Sheets

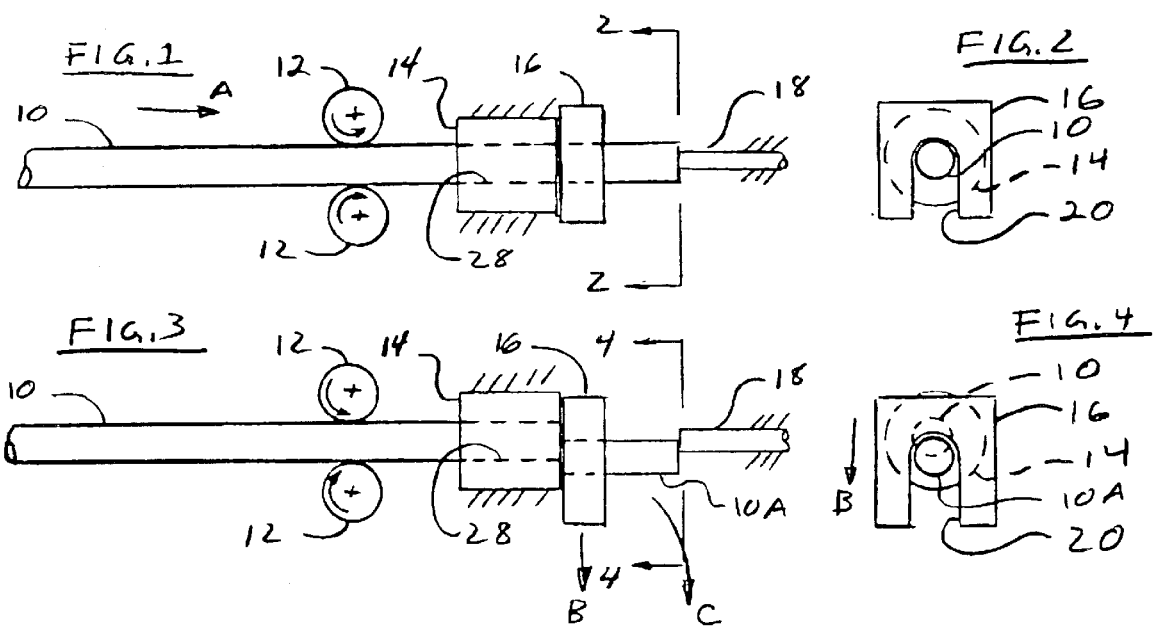
PRIOR ART - OPEN KNIFE

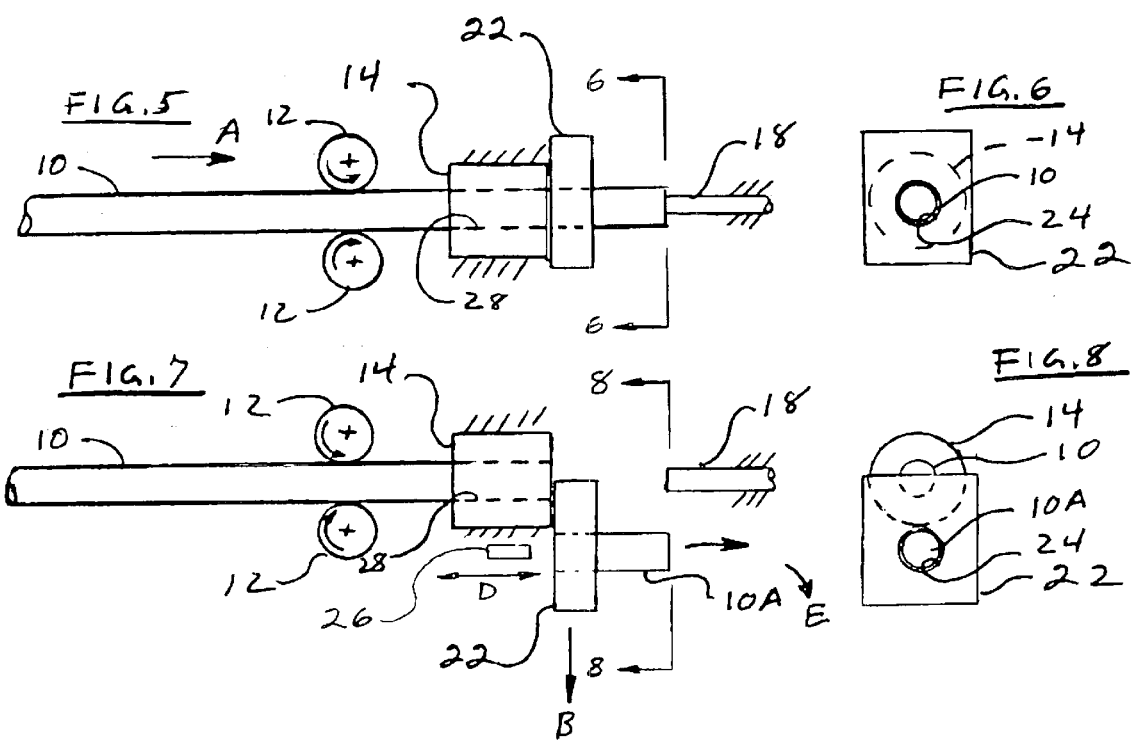
PRIOR ART - CLOSED KNIFE

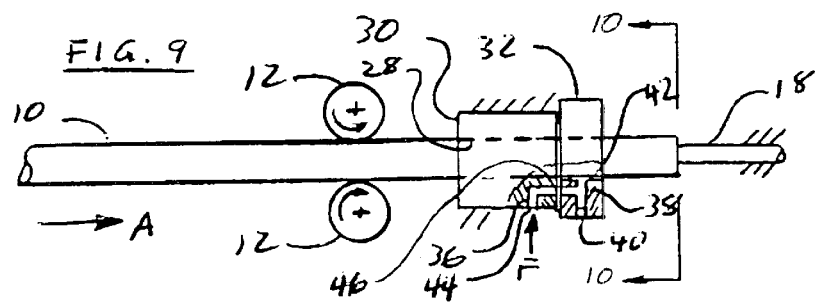
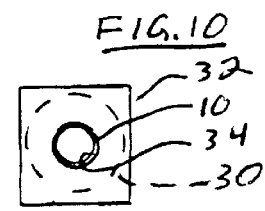
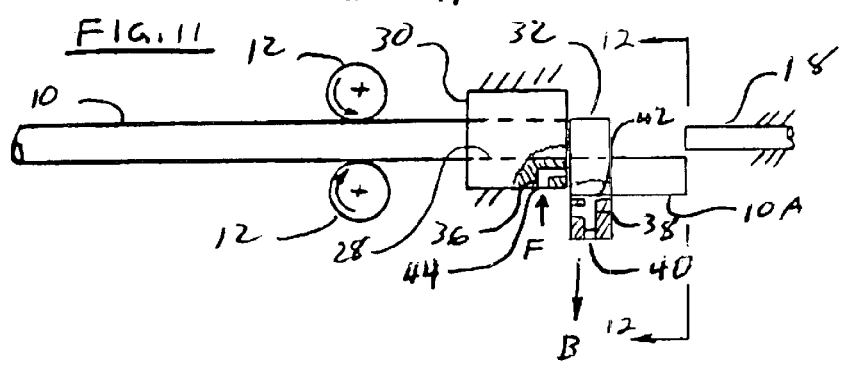
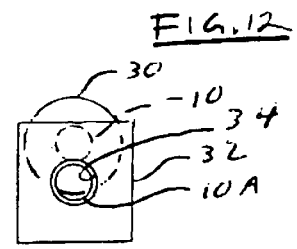

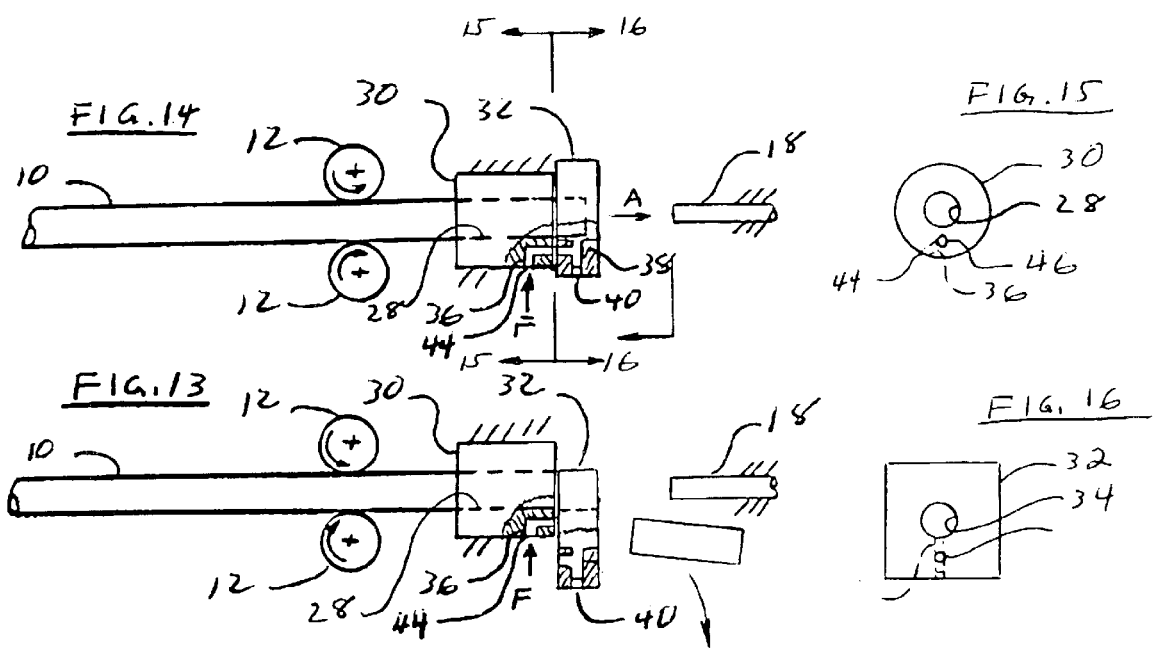

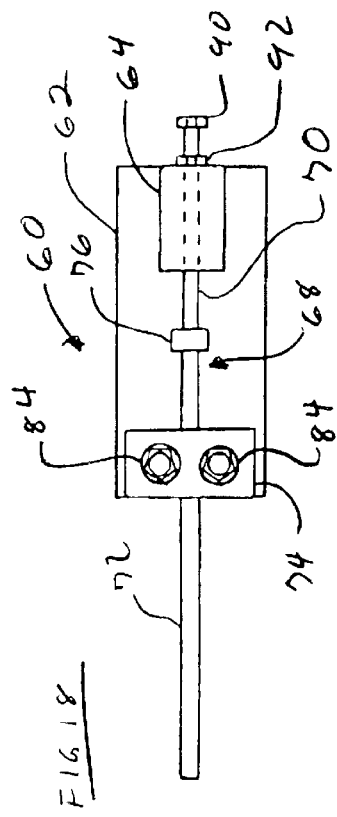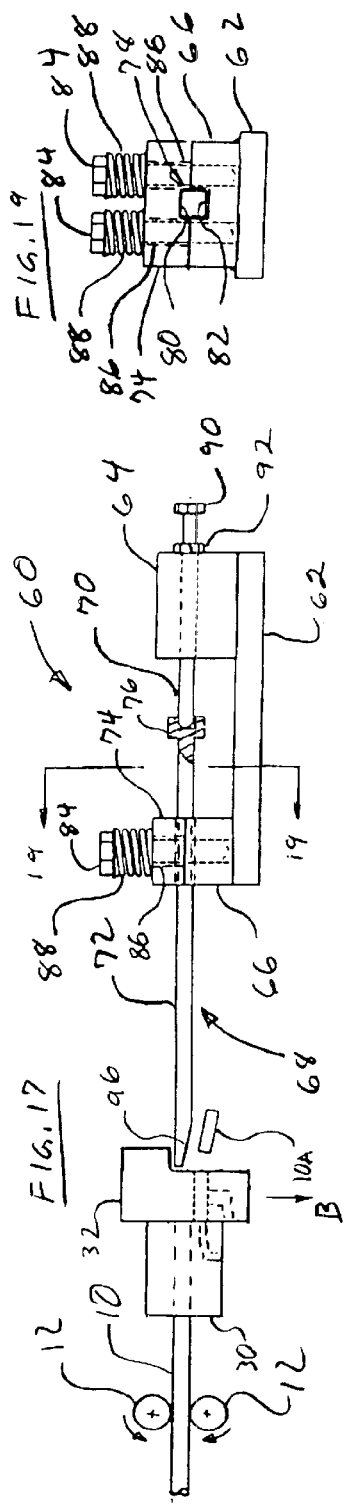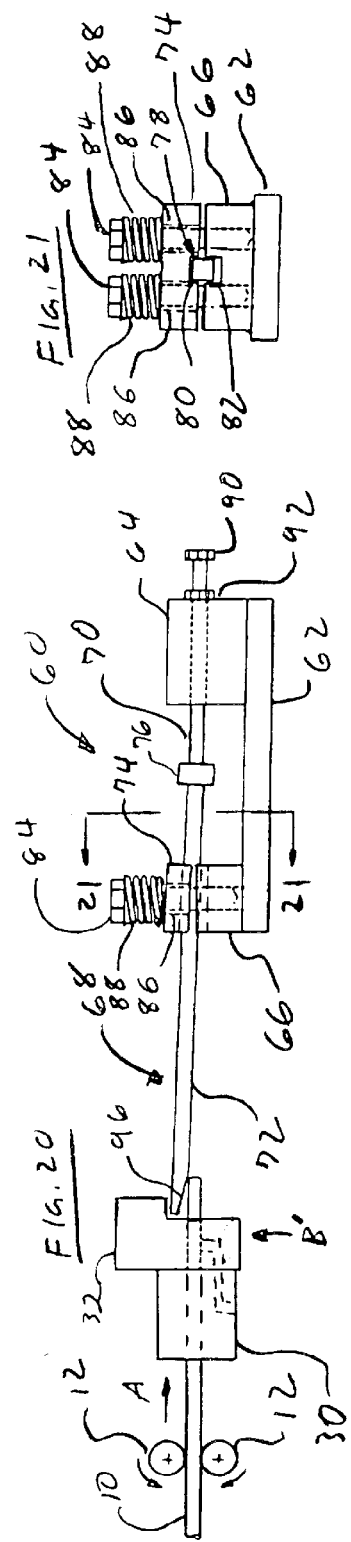

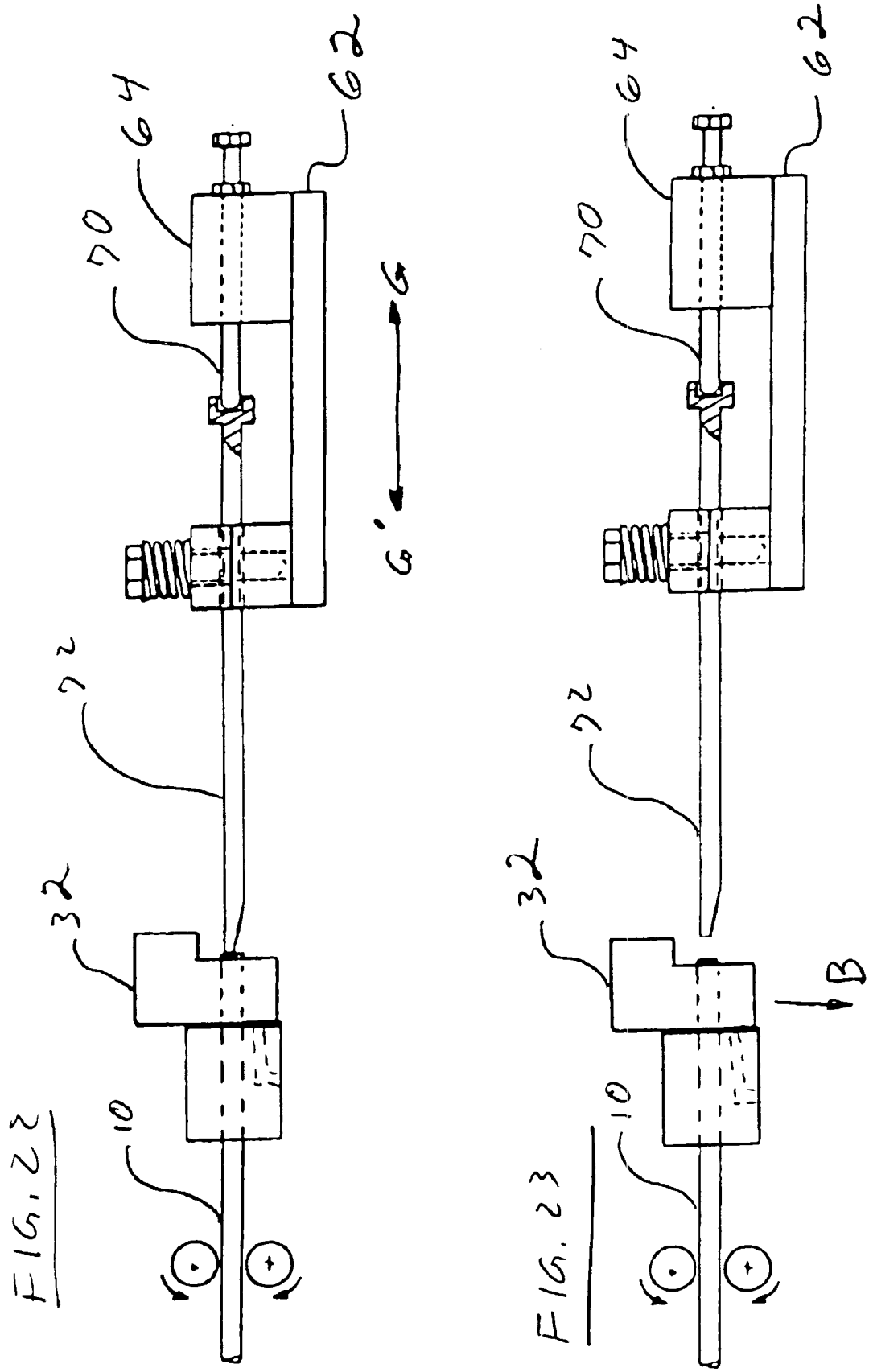

AIR EJECTION AND COMPLIANT GAGE PIN FOR ROD CUTTING MACHINES

BACKGROUND OF THE INVENTION

1. Field of Invention

The present invention relates generally to rod cutting machines.

More particularly, the invention relates to apparatus for automatic discharge of cut rods in closed-knife rod cutting machines, and which is particularly useful in connection with discharge of rods cut to a relatively short length and in high-speed machines.

2. Description of Prior Art

A number of rod cutting machines are known and available for cutting either wire stock or rod stock into shorter rods of a desired length, the cut rods being typically intended for further processing such as (but not limited to) in the production of roller bearings and other generally cylindrical parts.

One such type of machine is a so-called "straighten and cut" machine. In this instance, wire is fed into the machine from a coil of wire, the wire is then straightened and drawn into a length of rod stock material, and then cut into rods of the desired length.

Other machines are adapted for receiving and cutting elongated rod stock into shorter rods of a desired length.

Accordingly, it will be understood that reference to rod stock herein will include and alternately mean both pre-shaped, pre-cut rod stock and/or a supply of wire provided to an appropriate rod cutting machine.

Most conventional prior rod cutting machines are equipped with an open knife for cutting rod stock into shorter rods. The rod stock is fed by, for example, a pair of friction engaging rollers through a stationary cut-off support die and through a downwardly opening slot in the open knife until the stock extends through the knife a desired distance that will result in cut rods of the desired length. The rod stock is positioned in the knife with a gage pin or other suitable structure having a gage surface located downstream of the knife, the free end of the rod stock engaging the free end or gage surface of the gage pin to stop the rod stock from advancing further in the knife, the gage pin typically being adjustable for establishing different lengths of cut rods. With the rod stock in its desired position in the knife, an actuating mechanism actuates the knife downwardly to shear the rod stock at the junction between the knife and the cut-off die, producing a shorter rod cut to the desired length. The downwardly opening slot in the open knife allows the cut rod to then simply fall away from the knife and into, for example, a collection bin. The knife actuating mechanism then actuates the knife upwardly, returning the knife to the rod loading position, whereupon the rod stock automatically advances through and is positioned in the knife in preparation for another cutting cycle.

As is well known, cut rods are deformed during the shearing process, resulting in a material condition known as "roll-over" at the cut ends. In order to reduce this material deformation during shearing of the rods, the clearance between the knife and the adjacent end of the cut-off die is often reduced to within a few thousandths of an inch. Nevertheless, the lack of support under the rod extending past the cut-off die and through the open knife results in unavoidable distortion of the ends of the cut rods during the shearing process.

In certain instances, such as when cutting relatively long rods of several inches in length, this roll-over may not be of substantial concern, and is addressed or compensated for in subsequent processing.

However, the shorter the length of the cut rods, the more pronounced this distortion becomes since it accounts for an increasing percentage of the rod length, and the more difficult it becomes to remove or compensate for during subsequent processing. In certain instances and for certain subsequent processes, this distortion is simply not acceptable.

As a result, the open knife arrangement of conventional prior rod cutting machines is not suitable for use where precision cut rods with reduced end distortion are desired, and in particular, in connection with relatively short rods.

In order to reduce the distortion of cut rods, certain prior conventional rod cutting machines are equipped with a closed knife for shearing rods to the desired length. In this instance, the rod stock is again fed through the stationary cut-off die and the closed knife until the free end of the rod stock engages the free end of the gage pin. The closed knife is characterized by a bore for receiving the rod stock, the bore at least substantially encircling and preferably complete encircling the rod stock, and having the same cross-sectional profile as the rod stock. In order to provide for maximum support of the free end of the rod stock during the shearing operation, the bore is sized for a relatively close radial sliding clearance with the rod stock such as within a few thousandths or ten-thousandths of an inch radial clearance. As with the open knife, an actuating mechanism actuates the closed knife to shear the rod stock at the junction between the knife and the cut-off die.

The support provided by the bore of the closed knife, and the relatively close clearance fit between the bore and the rod stock results is substantially less end deformation and/or roll-over as compared with cutting the rod with a conventional open knife.

However, unlike the open knife machine, the cut rod can not simply fall away from the closed knife after the shearing operation. As a result, conventional prior closed-knife machines include a mechanical ejection arrangement including a second actuating mechanism for ejection of the cut rod from the closed knife. This second actuating mechanism is adapted for actuating an ejecting member at least partially into and out of the knife bore for ejection of the cut rod from the knife. After ejection of the cut rod and retraction of the ejection mechanism from the knife, the knife returns to the rod loading position whereupon the rod stock advances through the cut-off die and knife in preparation for another shearing cycle.

Although such conventional closed-knife rod cutting machines offer advantages over open knife machines with respect to reducing end deformation, operation of the closed knife and associated ejection apparatus suffer from several other drawbacks and disadvantages:

The need for the mechanical ejection apparatus including the second actuating mechanism raises the cost and reduces the reliability of a closed-knife machine as compared with an open-knife machine.

The need for contact between the ejection mechanism and the cut rod results in the need for a longer knife stroke, as compared with the stroke of an open-knife machine, in order for the cut rod to clear the cut-off die. Other things being equal, this longer stroke results in a slowdown of production in the conventional prior closed-knife machine.

In order for the rod ejection mechanism to operate, it must be precisely timed and synchronized with the timing of the knife actuating mechanism. Error in this synchronization can result in work stoppage and/or damage to the machine.

The need for the ejection mechanism to actuate at least partially into and out of the bore in the closed knife can result in the need for an additional pause or slowing down of the knife actuation cycle, resulting in further reduction of the production rate of the closed-knife machine.

In such closed-knife machines, additional expensive apparatus is typically provided to compensate for the reliability, increased stroke and timing requirements of the mechanical ejection actuating mechanism, and to raise the production rates back up to approaching the rates of a typical open-knife machine.

The relatively close clearance between the knife bore and the rod, which is desirable to reduce distortion of the rod during the shearing operation, can result in jamming of the cut rod in the knife. This jamming results from the distortion at the cut end of the rod, and/or fine debris or shavings from the shearing operation that remain in the bore after the cut rod has been ejected. Consequently, as the clearance is reduced to reduce the distortion, the greater the likelihood of the cut rod becoming lodged in the knife.

As a result of the presence of the gage pin in conventional machines, a cut rod that does become lodged in the knife and carried back to the loading station will typically result in interference with normal operation of and/or damage to the machine.

Moreover, prior closed knife rod cutting machines provide no means to insure that the knife bore is free of debris after the cut rod has been ejected.

Consequently, conventional ejection mechanisms of prior closed knife machines typically include provision to insure against such potential damage, such as with an ejection mechanism adapted to stroke entirely through the width of the bore in the knife. This results in a further slow down of the machine to accommodate the increased ejection mechanism stroke necessary to insure full ejection of the cut rod from the knife. Alternately, or in addition, the prior closed knife machine is equipped with safety mechanisms to detect a lodged cut rod and stop operation of the machine until the rod is cleared from the knife.

Thus, it is clear there is a need for a closed-knife rod cutting machine that includes automatic high-speed ejection of cut rods from the knife without the cost and complexity, and that solves and/or eliminates the above-mentioned problems and disadvantages associated with operation of prior closed-knife machines.

SUMMARY OF THE INVENTION

The general aim of the present invention is to provide new and improved apparatus for automatic ejection of cut rods in a closed-knife rod cutting machine; the apparatus being adapted to provide for high-speed operation with improved reliability and at less cost than prior closed-knife rod cutting machines.

A detailed objective is to achieve the foregoing by providing air ejection apparatus for automatic discharge of the cut rods from the closed knife as it moves away from the stock loading position.

A more detailed objective is to provide for such air ejection integrally in the cut-off die so as to further reduce the knife stroke and promote high speed operation.

Another more detailed objective is to provide complimentary air ejection means integral in the knife for automatic discharge of debris from the knife bore after ejection of the cut rod.

Another detailed objective of the invention is to provide a gage pin that is adapted for resilient movement, to automatically move out of the way in the event a cut rod becomes lodged in the knife and is carried back to the loading station, such that the cut rod is automatically cleared from the knife as the rod stock advances through the knife; the gage pin automatically returning to its gaging position upon ejection of the cut rod such that the advancing rod stock is properly positioned in the knife prior to the next shearing cycle.

The invention also resides in the gage pin being provided with a tapered end adapted to assist in removal of a cut rod from the knife prior to reaching the loading station.

Yet another more detailed objective is to retract the gage pin from the free end of the rod stock at the moment the knife engages the rod stock and cutting of the rod begins.

These and other objectives and advantages of the invention will become more apparent from the following detailed description when taken in conjunction with the accompanying drawings.

Briefly, in a preferred embodiment, the cut-off die is formed with an integral pneumatic line connected to an air supply, with the outlet of the pneumatic line positioned to eject the cut rod from the closed knife with a blast of air when the knife reaches the discharge position. The knife is provided with a second pneumatic line to carry air from the line in the cut-off die into the knife bore after the cut rod has been ejected. The gage pin extends through a support slot defined between a base and a cap that is spring-loaded against the base. In the event a cut rod jams in the knife and is carried back toward the loading station, the free end of the gage pin and the cap raise up as the upwardly moving cut rod engages the free end of the gage pin. The gage pin is also preferably mounted for timed retraction from the rod stock as the knife engages and begins to cut the rod stock.

BRIEF DESCRIPTION OF THE DRAWINGS

FIG. 1 is a side view of a conventional prior open knife and gauging pin apparatus of a type suitable for use in a rod cutting machine.

FIG. 2 is a view taken substantially along the line 2—2 of FIG. 1.

FIG. 3 is a side view of the apparatus of FIG. 1 but showing the knife in position after shearing a rod piece from the rod stock.

FIG. 4 is a view taken substantially along the line 4—4 of FIG. 3.

FIG. 5 is a side view similar to FIG. 1 of a conventional prior closed knife and gauging pin apparatus.

FIG. 6 is a view taken substantially along the line 6—6 of FIG. 5.

FIG. 7 is a side view similar to and of the apparatus of FIG. 5 but showing the knife in its down position prior to ejection of the cut rod.

FIG. 8 is a view taken substantially along the line 8—8 of FIG. 7.

FIG. 9 is a side view of a new and improved closed knife and gauging apparatus in accordance with the present invention, and suitable for use in a rod cutting machine.

FIG. 10 is a view taken substantially along the line 10—10 of FIG. 9.

FIG. 11 is a side view similar to and of the apparatus of FIG. 9 but showing the knife in its down position prior to ejection of the cut rod.

FIG. 12 is a view taken substantially along the line 12—12 of FIG. 10.

FIG. 13 is a side view similar to and of the apparatus of FIG. 9 but showing the knife in its down position with the cut rod being ejected from the knife.

FIG. 14 is a side view similar to and of the apparatus of FIG. 9 but showing the knife in its rod loading position with the rod stock advancing through the knife and toward the gage pin.

FIGS. 15 and 16 are views taken substantially along the line 15—15 and 16—16, respectively, of FIG. 14.

FIG. 17 is a side view of an alternate gauging pin embodiment of the present invention suitable for use in a rod cutting machine, with certain parts broken away and shown in cross-section.

FIG. 18 is a top view of the alternate gauging pin embodiment of FIG. 17.

FIG. 19 is an end view taken substantially along the line 19—19 of FIG. 17.

FIG. 20 is a side view similar to FIG. 17 but showing the gauging pin in a deflected position resulting from a jammed cut rod carried back to the rod-loading/gauging station.

FIG. 21 is an end view similar to FIG. 19 and taken substantially along the line 21—21 of FIG. 20.

FIG. 22 is a side view similar to FIG. 17 but showing the rod stock advanced through the knife and engaging the gage pin prior to beginning of the shearing cycle.

FIG. 23 is a view similar to FIG. 22 but showing the knife in a position engaging the rod stock and showing the gage pin retracted from the rod stock.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings in connection with apparatus adapted for use in a rod cutting machine of the type adapted to cut rod stock into shorter rods of a desired length.

An open knife and certain associated parts of a conventional prior open-knife rod cutting machine are illustrated diagramatically in FIGS. 1–4. In this instance, rod stock 10 is fed along its longitudinal axis in direction "A" by a pair of power-driven friction engaging rollers 12 through an opening 28 in a stationary cut-off support die 14 and through an open knife 16 until the free end of the rod stock engages the free end of a stationary gage pin 18 as shown in FIG. 1.

In a conventional manner, (i) the opening 28 in the die 14 is sized for relatively close clearance with the outer diameter (or the outer profile of the stock in the event the stock has a cross-section other than round) for support of the stock during the shearing operation of the machine, and (ii) the gage pin 18, although typically stationary during normal operation of the machine, is provided with means for longitudinal adjustment along axis direction "A" for cutting rods of different lengths.

As shown in FIGS. 2 and 4, the open knife 16 is characterized by a downwardly opening slot 20 with a width slightly larger than the diameter (or the maximum lateral dimension in the event the stock has a cross-section other than round) of the rod stock 10.

With the rod stock 10 in position against the gage pin 18, an actuating mechanism (not shown) of the rod cutting machine actuates the knife 16 downwardly in the direction indicated by arrow "B" in FIG. 3. This knife stroke shears the rod stock 10 at the junction between the knife 16 and the cut-off die 14 to produce the short rod 10A cut to the desired length.

The downwardly opening slot 20 in the knife 16 allows the cut rod 10A to then simply fall away from the knife in the direction generally indicated by arrow "C" in FIG. 3 and into, for example, a collection bin (not shown).

The knife actuating mechanism then actuates the knife 16 upwardly, returning the knife to the rod loading position shown in FIG. 1, whereupon the rod stock 10 advances through the knife in preparation for another cutting cycle.

A closed-knife apparatus of a conventional prior rod cutting machine adapted to reduce cut rod distortion and roll-over is illustrated diagramatically in FIGS. 5–8. In this instance, the rod stock 10 is again fed in direction "A" by the friction rollers 12 through the stationary cut-off die 14 and a closed knife 22 until the free end of the rod stock engages the stationary gage pin 18.

As shown in FIGS. 6 and 8, the closed knife 22 is characterized by a bore 24 having the same cross-sectional profile (i.e., round in the embodiment shown) as the rod stock, with the bore 24 typically being sized for a relatively close radial sliding clearance with the rod stock such as within a few thousandths or ten-thousandths of an inch.

As with the open knife 16, an actuating mechanism (not shown) actuates the closed knife 22 downwardly as indicated by arrow "B" in FIG. 7, and the rod stock is sheared at the junction between the knife 22 and the cut-off die 14 to produce the short rods 10A of the desired length.

The closed-knife rod cutting machine also includes an ejection member generally indicated at 26 and an operatively associated second actuating mechanism (not shown) for ejection of the cut rod 10A from the knife.

In this instance, the second actuating mechanism is adapted for actuating the member 26 in opposite directions indicated by arrow "D" generally between the position shown in FIG. 7 and a second position at least partially in the bore 24 for contacting the end of the cut rod and ejecting the cut rod from the knife 22 generally along trajectory "E".

After ejection of the cut rod 10A and retraction of the ejecting member 26 from the knife 22, the knife returns to the rod loading position shown in FIG. 5 whereupon the rod stock 10 advances through the cut-off die 14 and knife for another shearing cycle.

In accordance with one aspect of the invention, a closed-knife rod cutting machine is provided with air ejection operable to automatically eject cut rods 10A from the knife.

For purposes of illustration, a preferred embodiment of closed-knife air ejection according to the invention is shown diagramatically in the drawings in FIGS. 9–16.

In carrying out this aspect of the invention, the rod cutting machine is provided with an air transport line such as line 36 having (a) an inlet end 44 adapted for connection to an air supply (not shown), and (b) an outlet end 46 (i) proximate to and discharging toward the upstream side of the closed knife 32, and (ii) positioned for alignment with the bore 34 in the knife when the knife is stroked into its down position as shown in FIG. 11.

With this arrangement, providing pneumatic pressure and/or a sufficient flow capacity to the line 36 results in (a) automatic non-contacting pressurized ejection of the cut rod 10A from the bore 34 of the knife as the knife approaches and/or reaches its down stroke or ejection position as shown in FIG. 13, and (b) automatic discharge of debris remaining in the opening 34 with the blast of air flowing therethrough as the rod is ejected. The ejection air supply can either be provided intermittently and timed with the knife cutting cycle, or preferably be supplied on a continuous basis during normal operation of the machine.

In preferred embodiments, the pneumatic line 36 is provided internally in the cut-off die 30 such as illustrated in the drawings. This arrangement reduces the necessary stroke of the knife 32 to a minimum, with no additional tubes or moving parts and minimal impact on the cost of the machine.

In further carrying out this aspect of the invention, the closed-knife rod cutting machine is preferably provided with a second pneumatic transport line such as line 38 adapted to discharge into the bore 34 of the knife prior to and/or during loading of the knife with the advancing rod stock (see FIG. 15), and during the rod shearing operation. Advantageously, this second pneumatic line assists in (a) clearing additional debris from the bore 34, and (b) provides a cushioning supply of air in the annulus 42 between the rod stock 10 and the bore 34 as the rod stock advances through the knife.

In the preferred embodiment shown, the knife 32 is provided with the internal pneumatic transport line 38 having (a) an inlet aligned with outlet 46 of the line in the cut-off die 30 when the knife is in the rod loading position as shown in FIG. 9, and (b) an outlet opening into the knife bore 34 through which the rod stock 10 passes, with a plug 40 installed after drilling of the air transport line 38 during manufacture of knife.

Advantageously, providing the line 38 integral in the knife results in a compact closed-knife cutting arrangement with no additional parts and substantially no additional cost to the rod cutting machine.

From the foregoing, it will be apparent that a rod cutting machine equipped with a closed knife and air ejection discharge according to the invention offers several advantages over and solves several problems associate with prior closed-knife rod cutting machines:

Air ejection results in the elimination of the second actuating mechanism and associated components for mechanical ejection of the cut rod from the knife.

The blast of air that clears the knife bore 34 before or during each stroke, and the cushioning air during loading of the rod stock, reduces the likelihood that a cut rod will jam in the knife.

In many shop environments, a source of compressed air is available throughout the plant as "shop" air. In such instances, the cost of implementing air ejection is simply the small cost of machining a few internal pneumatic lines in the cut-off die and knife. And where necessary, the cost of providing a source of compressed air is relatively small compared with the cost and complexity of operation associated with the second actuating mechanism and mechanical ejection of cut rods in prior closed-knife machines.

Thus, air ejection results in a substantial reduction in cost and operating complexity of closed-knife rod cutting machines, and eliminates the need for synchronized operation of the ejection mechanism.

As will be evident from the embodiment shown in the drawings, air ejection also enables the length of the knife stroke to be substantially reduced as compared with prior closed knife machines. As a result, air ejection permits the machine to operate at a relatively higher production rate.

In view of the forgoing, it is clear that a closed knife rod cutting machine provided with air ejection discharge is capable of operating at a faster production rate, with less complexity and expense, and with increased reliability, than prior closed-knife machines.

In accordance with another aspect of the invention, a closed-knife rod cutting machine is equipped with a gauge pin that is uniquely adapted and configured to permit and assist in automatically clearing a cut rod 10A that may be lodged in the shearing knife 32 during its return stroke B' as shown in FIG. 20.

In this instance, the gage pin is adapted for automatic movement away from it normal position in the event a cut rod 10A is lodged in the knife 32—to permit the rod stock 10 advancing through the knife to clear the cut rod 10A from the knife upon its return to the loading position.

In preferred embodiments, the gage pin is provided with a tapered end to assist in (a) dislodging the rod prior to the knife reaching the stock loading position, and (b) guiding the dislodged cut rod away from the knife.

For purposes of illustration, one embodiment of a preferred gage pin 72 and associated apparatus (collectively indicated as apparatus 60) according to the invention is shown in the drawings in FIGS. 17–21. In this instance, the apparatus 60 includes a base 62, and front and rear supports 66 and 64, respectively, connected to the base 62. The gage pin assembly 68 includes a rear pin 70 threaded into the rear support 64, and a front gage pin 72 slidably received through a bore 78 extending between the front support 66 and a cap 74. The free end of the gage pin 72 is adjustable longitudinally toward and away from the knife 32, for positioning of the free end of the rod stock 10 as it loads through the knife, such as by turning the rear pin 70 in the rear support 64 with nut 90, and locking the rear pin 70 in position with jam nuts 92. The gage pin 72 is relatively stiff in the axial direction "A" to provide consistent, precise positioning of the rod stock in the knife upon impact of the advancing rod stock against the free end of the gage pin.

In carrying out this aspect of the invention, the gage pin 72 is adapted for resilient movement in the direction B' from its normal position aligned with the advancing rod stock. In the embodiment shown, the gage pin 72 and rear pin 70 are connected such as with a collar 76 or alternate connecting means adapted to allow angular movement of the gage pin 72 with respect to the rear pin 70 in the direction of the return knife stroke. In this instance, the collar is fixed to the right end of the gage pin, and the left end of the rear pin is slidably received into a socket formed in the collar. Alternately, for example, the gage pin 72 and rear pin 70 are connected with a ball-joint or other arrangements suitable for simultaneously permitting the desired angular movement while preventing longitudinal separation between the pin members such as including retaining rings, or spring biasing means.

As shown in FIG. 19, the bore 78 is defined by two aligned slots 80 and 82 formed in the mating surfaces of the cap 74 and the front support 66, respectively. The cap 74 is resiliently connected to the front support 66 by a pair of compression springs 88 elastically compressed between the head of a pair of fasteners 84 and a cap 74; the threaded fasteners 84 being (a) spaced laterally on each side of the bore 78, (b) slidably received through bores 86 formed in the cap 74, and (c) threaded into the front support 66.

With this arrangement, application of an upwardly directed external force on the gage pin 72 lifts the cap 74 from the front support 66, and the springs 88 return the cap downwardly into contact with the housing upon removal of the external force.

Normal operation of the rod cutting machine equipped with the gaging pin apparatus 60 proceeds as previously described. With the knife 32 in the rod loading position, the rollers 12 feed the rod stock 10 in the direction "A" though the bore 34 of the closed knife 32 until the free end of the rod stock engages the free end of the gage pin 72. The knife 32 then strokes downwardly, shearing the rod 10A from the rod stock, and the cut rod aligns with the outlet of the air port 36 for pressurized air ejection from the knife such as shown in FIG. 17.

In the event the cut rod 10A is not fully ejected, it will be carried upwardly toward the loading station during the return stroke B' of the knife. The returning cut rod results in application of an upwardly directed force on the end of the gage pin 72, raising the free end of the gage pin and the cap 74 from the front support 66 as shown in FIGS. 20 and 21. The rod stock 10 then feeds through the knife 32, dislodging the cut rod from the knife, whereupon the springs 88 cause the cap 74 to snap back into position on the front support, quickly repositioning the gage pin 72 for gauging the rod stock in the knife for the next shearing cycle before the free end of the advancing rod stock reaches the position of the gage pin.

Thus, the gage pin 72 is uniquely adapted for resilient movement in the same direction as the knife during its returning stroke to permit automatic clearing of a cut rod carried back toward the loading position in the knife without interference with or slowdown to the normal operation of the rod cutting machine.

In further carrying out this aspect of the invention, the free end of the gage pin 72 is preferably formed with a taper 96 on the lower portion thereof, the taper sloping downwardly upon progressing away from the knife. If the knife returns upwardly with a cut rod 10A, the cut rod will engage this taper 96, resulting in a reaction force on the free end of the cut rod directed at an angle downwardly and away from the knife. As a result, the taper assists in loosening the cut rod from the knife, and in instances where the pin has been substantially ejected but hangs at the end of the knife, the taper may alone be sufficient to dislodge and guide the cut rod from the knife prior to reaching the loading station.

In the embodiment shown, the gage pin 72 is formed with square cross-section and the bore 82 is formed with a complimentary square cross-section. Although it is evident the gage pin and bore 82 may be made round, or formed with any other convenient cross-section, it has been found that a rectangular or square cross-section provides certain advantages. In particular, the complimentary square gage pin and upper slot 80 are in substantially line-to-line contact as the pin is raised upwardly. This reduces the likelihood that the gage pin will shift sideways, as a result of manufacturing tolerances in the side clearance between the pin and the slot, as the cap is raised from the front housing. In addition, for a gage pin of a given height, a square pin is stiffer than a round pin, thus assisting in providing for accurate, consistent positioning of the rod stock in the knife prior to shearing. Moreover, as compared with a round cross-section, the square cross-section assist in preventing the pin from twisting or bending other than in the B–B' directions.

In further carrying out the invention, the gage pin 72 is timed to retract from engagement with the rod stock 10 at the moment the knife 32 engages the rod stock during the cutting cycle. Engagement between the knife and the rod stock prevents the rod stock from advancing as the gage pin retracts, and retraction of the gage pin prevents the cut rod 10A from dragging against the gage pin as it is cut and carried in the knife toward the discharge station.

In the embodiment shown, the base 62 is mounted for linear forward and reverse movement along the "A" direction as indicated by arrow G–G' in FIG. 22. Since the gage pin 72 is fixed to the base through rear pin 70 and rear support 64, the gage pin moves linearly with the base. The movement of the base 62 and thus the gage pin 72 is controlled and timed for retraction in the G direction when the knife strokes sufficiently in the B direction to engage the rod stock. Engagement between the knife and the rod stock, and retraction of the gage pin is generally shown in FIG. 23. Upon completion of the shearing operation and prior to the knife returning to the loading position, the gage pin returns to its gaging position (such as shown in FIG. 17), in preparation of another shearing cycle, and as discussed above to assist in ejection of a cut rod that may not have been fully ejected from the knife at the discharge station.

In a preferred embodiment, the base 62 is mounted to a linear slide arrangement (not shown), and is connected to an appropriately timed actuating mechanism such as a cam-driven actuator for synchronized operation with the actuating mechanism controlling movement of the knife 32. This and alternate arrangements for effecting linear movement of the base 62 and gage pin 72 in timed relation with movement of the knife 32 are well known and within the design capability of skilled artisans.

In summary, from the foregoing, it will be apparent that the present invention brings to the art new and improved ejection apparatus for use in a closed-knife rod cutting machine, the apparatus being uniquely adapted for automatic air ejection of cut rods and cleaning of the knife bore. A preferred embodiment also includes a gage pin adapted to (i) retract at the moment the knife engages the rod stock during the cutting cycle, (ii) automatically move out of the way in the event a cut rod is not fully ejected and is carried in the knife back toward the loading station, to permit the cut rod to be automatically cleared from the knife by the advancing rod stock, and to then resiliently return to position for gaging the rod stock in the knife, and (iii) tapered to assist in clearing of a cut rod as it approaches the loading station. As a result, the present invention provides for reliable, automatic, low cost, and high speed cut rod ejection from the closed knife without the cost, complexity of operation, and concern for timing between the knife stroke and mechanical ejection apparatus of prior closed-knife rod cutting machines.

I claim:

1. A machine for cutting rods from rod stock, the machine comprising:
    means for advancing the rod stock along a first axis;
    a closed knife mounted for reciprocating movement through said axis between first and second positions, said knife having an opening (i) extending along said axis and through which the advancing rod stock passes when the knife is in said first position and (ii) radially displaced from said axis when in said second position, said knife further having an edge to shear off a rod from the rod stock upon moving toward said second position;
    an air supply having a discharge port (i) positioned upstream of the knife, and (ii) in fluid communication with said opening and oriented to discharge through said opening when said knife is in said second position for ejecting the cut rod from the knife; and
    further comprising a (a) gage surface (i) located downstream of said knife, (ii) facing towards said knife, and (iii) intersecting said axis to position the advancing rod stock in the knife, and (b) a contact surface (i) in fixed relation with said gage surface, (ii) extending in a direction away from said gage surface, and (iii) facing towards said second position with respect to said axis to engage a sheared rod that may be carried back in the knife as it returns to said first position, said gage surface and contact surface being connected for resilient movement away from and towards said axis as the knife returns to said first position to enable discharge of said sheared rod from the knife in said first position by the advancing stock.

2. The machine of claim 1 further comprising a gage pin having a free end defining said gage surface, and having a side portion defining said contact surface and tapering away from said axis upon progressing in a direction away from said knife.

3. A machine for cutting rods from rod stock, the machine comprising:

means for advancing the rod stock along a first axis;

a closed knife connected for reciprocating linear movement through said axis between first and second positions, said knife having an opening (i) extending along said axis and through which the advancing rod stock passes when the knife is in said first position and radially displaced from said axis when in said second position, said knife further having an edge to shear off a rod from the rod stock upon moving toward said second position;

an air supply having a discharge port (i) positioned upstream of the knife, and (ii) in fluid communication with said opening and oriented to discharge through said opening when said knife is in said second position for ejecting the sheared rod from the knife when in said second position; and a gage pin located downstream of said knife and arranged to intersect said axis to engage the downstream end of the advancing rod stock and position the stock in the knife, the gage pin being connected for resilient linear movement away from and towards said axis and with the knife as the knife returns to said first position to enable discharge of a sheared rod from the knife by the advancing stock with the knife in said first position.

4. The machine of claim 3 further comprising a base located downstream of the knife and a cap connected to the base for resilient movement towards and away from said axis, said gage pin passing between said base and said cap such that said resilient movement of the cap established said resilient movement of the gage pin.

5. The machine of claim 3 in which the gage pin is formed with a tapered portion facing generally towards said second position with respect to said axis for engagement with the rod as the rod approaches said first position to assist in removal of the rod from the knife.

6. The machine of claim 3 further comprising a stationary support die having an opening aligned with the opening in said knife when in said first position and through which the advancing rod stock passes upstream of the knife, and having said discharge port aligned with the opening in the knife when the knife is in said second position.

\* \* \* \* \*